(12) United States Patent
Kriegesmann

(10) Patent No.: US 9,229,921 B2
(45) Date of Patent: Jan. 5, 2016

(54) METHOD AND SYSTEM FOR PROCESSING THE INPUT IN A XML FORM

(75) Inventor: Peter Kriegesmann, Mannheim (DE)

(73) Assignee: Software AG, Darmstadt (DE)

( * ) Notice: Subject to any disclaimer, the term of this patent is extended or adjusted under 35 U.S.C. 154(b) by 1927 days.

(21) Appl. No.: 11/857,181

(22) Filed: Sep. 18, 2007

(65) Prior Publication Data

US 2008/0077853 A1    Mar. 27, 2008

(30) Foreign Application Priority Data

Sep. 25, 2006 (EP) .................................... 06019984

(51) Int. Cl.
*G06F 17/22* (2006.01)
*G06F 17/24* (2006.01)

(52) U.S. Cl.
CPC .......... *G06F 17/243* (2013.01); *G06F 17/2211* (2013.01); *G06F 17/2247* (2013.01)

(58) Field of Classification Search
CPC . G06F 17/2211; G06F 17/2247; G06F 17/24; G06F 17/248; G06F 17/218; G06F 17/243
USPC .......... 715/221–223, 226, 229, 239, 243, 250
See application file for complete search history.

(56) References Cited

U.S. PATENT DOCUMENTS 7,168,035 B1* 1/2007 Bell et al. ..................... 715/234
7,281,018 B1* 10/2007 Begun et al. ........................... 1/1
2002/0023113 A1* 2/2002 Hsing et al. .................... 707/513
2002/0073236 A1* 6/2002 Helgeson et al. ............. 709/246
2003/0237047 A1* 12/2003 Borson .......................... 715/513
2005/0102364 A1* 5/2005 Ozzie et al. .................... 709/207
2005/0256893 A1* 11/2005 Perry ............................ 707/101
2006/0294451 A1* 12/2006 Kelkar et al. ................. 715/500
2007/0240035 A1* 10/2007 Sthanikam et al. ........... 715/513

FOREIGN PATENT DOCUMENTS

GB          2 394 804      5/2004
WO         02/075533       9/2002

OTHER PUBLICATIONS

Jessica Chen, "Formal Modeling of Java GUI Event Handling", published: 2002, publisher: Springer Berlin/Heidelberg, pp. 359-370.*
Office Action of Apr. 20, 2009, in European Patent application No. 06019984.1, 8 pages.
"Comparing Pieces of XML"; Jan. 23, 2009; 11 pages. Accessed from Internet: http://xmlunit.sourceforge.net/userguide/html/ar01s03.html.
"Events vs. Trees"; Jan. 23, 2009; 2 pages. Accessed from Internet: http://www.saxproject.org/event.html.

(Continued)

*Primary Examiner* — Wilson Tsui
(74) *Attorney, Agent, or Firm* — Meyertons Hood Kivlin Kowert & Goetzel, P.C.; Jeffrey C. Hood; Joel L. Stevens

(57) ABSTRACT

System and method for processing the input in an XML form. The method may include providing a template XML form to the user, receiving a modified XML form from the user, identifying the differences between the template XML form and the modified XML form and further processing the modified XML form based on the identified differences.

20 Claims, 3 Drawing Sheets

Figures 1, 2:
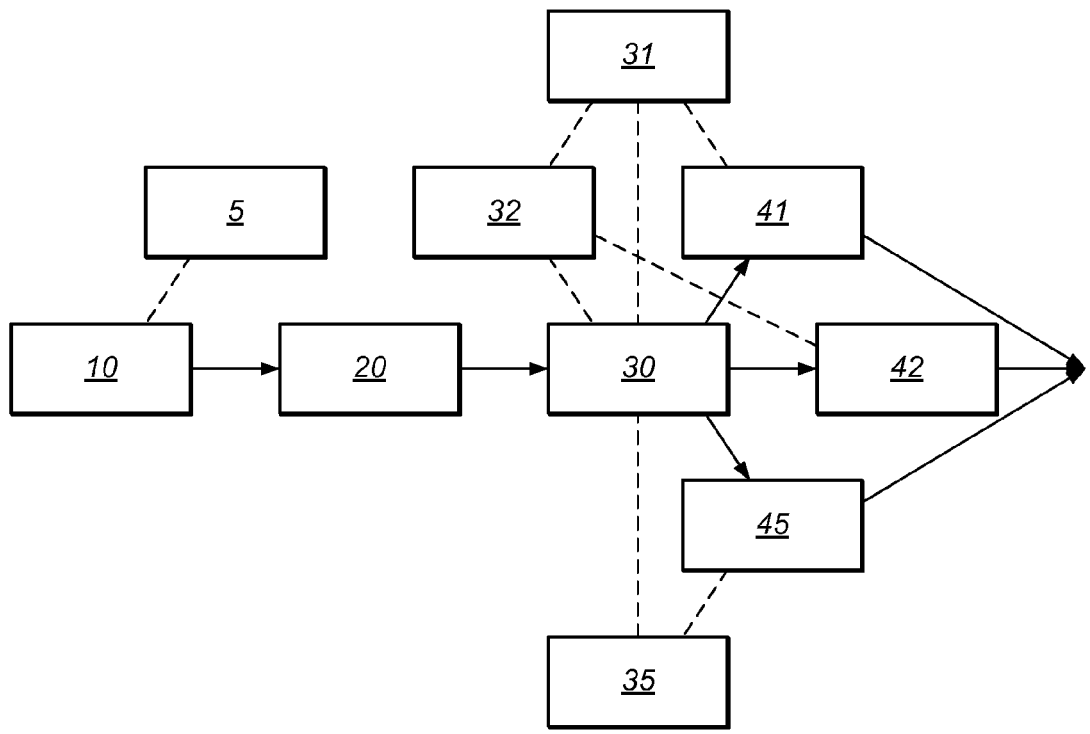

| Difference Type | Name | Location |
|---|---|---|
| Entry was added | Item | Child of x:orderlist<br>Position = 1 |
| Entry was added | Item | Child of x:orderlist<br>Position = 2 |
| Entry was changed | Address<br>Field:         Street<br>Old Value:   Ocean Drive<br>New Value: Lincoln Street | Child of x:address |

(56) References Cited

OTHER PUBLICATIONS

Office Action of Sep. 17, 2008, in European Patent application No. 06019984.1, 7 pages.
Bacon, Tim; "A tour of XMLUnit"; Sourceforge.net; Jan. 2003; retrieved from Internet: http://web.archive.org/web/20040205195221/xmlunit.sourceforge.net/XMLUnit.pdf; 7 pages.
Speicher, et al., "Update X-Forms Using X-Forms", May 24, 2006, IBM Corp., NY, USA, Retrieved from the Internet: http://www-128.ibm.com/developerworks/library/x-xforms4sforms/, 12 pages.
Boyer, et al., "XForms 1.0 (Second Edition)", Mar. 14, 2006, W3C, W3C Recommendation, retrieved from the Internet: http://www.w3.org/TR/xforms/, 16 pages.
Boyer, et al., "The XForms Computation Engine: Rationale, Theory and Implementation Experience", Aug. 2002, Proceedings of the 6th lasted International Conference on Internet and Multimedia Systems and Applications, Kauai, Hawaii, USA, Retrieved from Internet: "http://users.tkk.fi/honkkis/articles/xforms_computes.pdf", 10 pages.
European Search Report for application No. EP 06019984, mailed Feb. 9, 2007.

* cited by examiner

```
<x:order xmlns:x="urn:my.online.shop">
    <!--Order Template-->
    <x:bankdetails>
            <x:account>12345</x:account>
            <x:bankcode>A1234</x:bankcode>
            <x:bankname>CitiBank</x:bankname>
    </x:bankdetails>
    <x:address>
            <x:name>Jim Miller</x:name>
            <x:street>Ocean Drive</x:street>
            <x:city>Los Angeles</x:city>
    </x:address>
    <x:orderlist/>
</x:order>
```
100

```
<x:order xmlns:x="urn:my.online.shop">
    <!--Order Template -->
    <x:bankdetails>
            <x:account>12345</x:account>
            <x:bankcode>A1234</x:bankcode>
            <x:bankname>CitiBank</x:bankname>
    </x:bankdetails>
    <x:address>
            <x:name>Jim Miller</x:name>
            <x:street>Lincoln Street</x:street>
            <x:city>Los Angeles</x:city>
    </x:address>
    <x:orderlist>
            <x:item id="IPN">
                    <x:description>iPod nano</x:description>
                    <x:price>249,99 USD</x:price>
                    <x:quantity>1</x:quantity>
            </x:item>
            <x:item id="PSP">
                    <x:description>Sony PSP</x:description>
                    <x:price>249,99 USD</x:price>
                    <x:quantity>1</x:quantity>
            </x:item>
    </x:orderlist>
</x:order>
```
200

FIG. 3

| Difference Type | Name | Location |
|---|---|---|
| Entry was added | Item | Child of x:orderlist Position = 1 |
| Entry was added | Item | Child of x:orderlist Position = 2 |
| Entry was changed | Address<br>Field:      Street<br>Old Value:  Ocean Drive<br>New Value:  Lincoln Street | Child of x:address |

FIG. 4

| First XML Document | file:orderTemplate.xml |
|---|---|
| analyzed xpath | /x:order[1] |
| excluded xpath | //comment() |
| Second XML Document | file:orderR1.xml |
| analyzed xpath | /x:order[1] |
| excluded xpath | //comment() |
| Configuration Details | |
| namespace awareness | true |
| prefix awareness | false |
| whitespace awareness | false |
| compare strategy | ordered |
| display excluded nodes | true |

```
<x:order xmlns:x="urn:my.online.shop">
   <!--Order Template-->
   <x:bankdetails>
      <x:account>12345</x:account>
      <x:bankcode>A1234</x:bankcode>
      <x:bankname>CitiBank</x:bankname>
   </x:bankdetails>
   <x:address>
      <x:name>Jim Miller</x:name>
      <x:street>
        Ocean Drive
        Lincoln Street
      </x:street>
      <x:city>Los Angeles</x:city>
   </x:address>
   <x:orderlist>
      <x:item id="PSP">
         <x:description>Sony PSP</x:description>
         <x:price>249,99 USD</x:price>
         <x:quantity>1</x:quantity>
      </x:item>
      <x:item id="IPN">
         <x:description>iPod nano</x:description>
         <x:price>249,99 USD</x:price>
         <x:quantity>1</x:quantity>
      </x:item>
   </x:orderlist>
</x:order>
```

*FIG. 5*

METHOD AND SYSTEM FOR PROCESSING THE INPUT IN A XML FORM

PRIORITY CLAIM

This application claims benefit of priority of European application no. 06 019 984.1 titled "Method and System for Processing the Input in a XML Form", filed Sep. 25, 2006, and whose inventor is Peter Kriegesmann.

INCORPORATED BY REFERENCE

European application no. 06 019 984.1 titled "Method and System for Processing the Input in a XML Form", filed Sep. 25, 2006, and whose inventor is Peter Kriegesmann, is hereby incorporated by reference in its entirety as though fully and completely set forth herein.

TECHNICAL FIELD

The present invention relates to a method and a system for processing the input in a XML form

DESCRIPTION OF THE RELATED ART

In many situations, content based routing is an important aspect of information technology. For example, if a user enters some data into a form presented via the Internet on a screen of his browser, further processing of this data typically depends on the content of the entries made by the user. For example, the elements of a database might be modified, deleted or new elements added based on the user input into such a presented form.

In the prior art approach for content based routing, a form is sent in a first step to a client, possibly in response to a corresponding request from the client. After a certain amount of time or a submit command from the user, the response form, i.e. the form with the modifications performed by the user, is retrieved. Subsequently, the response form, which is typically an eXtensible Markup Language (XML) document, is processed based on its content.

To this end, entries in the response form are processed using an absolute selection path. For example, the address of the user contained in a certain line in the response form could be investigated, e.g., whether a certain condition is met, which determines the further processing of the retrieved data of the form in one way or the other. If the whole response form is to be evaluated, all entries must be investigated in this manner. A default processing of the response form can be provided, which, however, will only correctly work if all relevant entries of the response form are sequentially processed and if none of the conditions relating thereto is fulfilled. The major disadvantage is, however, that minor changes of the structure of the form (and therefore the response form) will require a substantial revision of the processing logic, since the absolute selections paths will no longer match the desired entries of the changed form.

Correspondingly, improvements in XML form processing are desired.

SUMMARY OF THE INVENTION

Various embodiments of a method for processing input to an XML form are presented below.

The method may include providing a template XML form, receiving the modified XML form, identifying the differences between the template XML form and the modified XML form and further processing the modified XML form based on the identified differences.

Accordingly, the template may serve as a reference. The entries made by a user or a web service application filling out the form are processed by tracking the differences between the modified form and the reference form. Instead of analyzing the whole document, the information already contained in the template form is taken into account, so that only the difference or delta between the two forms determines the further processing of the form. As a result, the required processing time may be reduced. Further, if the schema of the template changes, the schema of the modified XML form will change in a similar manner, so that the resulting difference between the two forms is not affected by this change. Accordingly, the evaluation logic does not have to be adapted to the changed schema but can still be used to process the entries, which may reduce the overall configuration effort and allow for fast prototyping of solutions.

In some embodiments, identifying the differences between the template XML form and the modified XML form may be restricted to differences concerning predetermined entries in the template XML form and/or the modified XML form, wherein preferably a configurable comparator involving one or more Event Listeners is used. Therefore, not all differences between the template form and the modified form may be tracked, but only differences, which are identified by suitable Event Listeners of the comparator such as an Add Event Listener identifying one or more added entries, a Modified Event Listener identifying one or more modified entries and/or a Delete Event Listener identifying one or more deleted entries in the modified XML form. Selecting the suitable Event Listeners is therefore one way of configuring the comparator.

In one embodiment, there may be a Default Listener identifying differences between the template XML form and the modified XML form, which are not identified by any of the other Event Listeners. The Default Listener may increase the reliability of the method, since it assures that any difference is processed in a predetermined manner.

Since the Event Listeners may be operating independently from each other, they may process the modified XML form in parallel to increase the overall processing speed.

In some embodiments, identifying the differences between the template XML form and the modified XML form may include the use of an XML difference tracker identifying the difference of two XML documents, wherein the XML difference tracker is selectively namespace aware and/or whitespace aware and/or selectively aware of different orders of the elements of two XML documents to be compared.

Additionally, a system may be adapted for processing input into an XML form as described herein. Similarly, program instructions stored on a memory medium may be executed to process input into an XML form as described herein.

SHORT DESCRIPTION OF THE DRAWINGS

In the following detailed description, presently preferred embodiments of the invention are further described with reference to the following figures:

FIG. 1: Schematic overview of one embodiment invention for processing the input in a XML form;

FIG. 2: An exemplary XML template form, as it could be used in the embodiment of FIG. 1;

FIG. 3: The XML form of FIG. 2 after modifications performed by a user, a web service application or the like, according to one embodiment;

FIG. 4: A table presenting the results obtained from the comparator of the embodiment of FIG. 1 comparing the XML template form of FIG. 2 and the modified XML form of FIG. 3, according to one embodiment; and FIG. 5: An exemplary output of the comparator of FIG. 1 displaying the results in the table of FIG. 4, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 presents a schematic overview of the method and system according some embodiments. The sequence of workflow is illustrated in FIG. 1 by continuous lines, while configuration data, which affect the processing of the XML forms, are illustrated by dashed lines.

In step 10, an XML form may be sent to a user, for example via the Internet. Whereas the present invention will typically be used in a scenario, wherein the computer system on which the user performs his input is different from the computer system which evaluates and processes the input, all steps may alternatively be performed on a single machine, which may receive user input and process the input in accordance with methods described herein. Thus various embodiments may be performed across multiple machines or on a single machine, as desired. Further, as used herein, the term 'user' may include a human user operating a user interface or any kind of software or automated process for filling out the XML form, such as a web service application in a SOA (service oriented architecture).

The XML form sent to the user in step 10 may have been configured in a preceding step 5 so that the desired information can be obtained from the user. In step 20, the system may wait for a response from the user. After a certain amount of time or when the user indicates that the input is finished, the modified form is forwarded to a comparator 30.

The operation of the comparator 30 on the modified XML form may be determined by a number of Event Listeners. For example, there may be an Event Listener 31 for verifying whether the user has added an item to a list contained in the original XML form. In other words, the Event Listener 31 may be restricted in its analysis of the differences between the original XML form and the modified XML form to the identification of any item added by the user to the list. Any other changes of the overall XML form may not be registered by the Event Listener 31.

In a similar manner, there may be another Event Listener 32, which is restricted to analyzing changes in an address of the user specified in the XML form. Again, the Event Listener 32 may disregard any other differences between the original XML form and the modified XML form as received from the user.

Both Event Listeners 31 and 32 may comprise additional instructions, possibly including how to further process the respective data in the modified XML form received from the user. In FIG. 1, this is illustrated by the dashed lines extending from the respective Event Listener 31, 32 to the corresponding processing step 41, 42. Note that the two Event Listeners 31 and 32 are only examples of a large variety of different Event Listeners (not shown), which may each serve to identify one or more differences in the modified XML form compared to the original XML form. For example, there might be a further Event Listener detecting any item that has been deleted from the order list or another Event Listener identifying items that have been modified. Overall, the Event Listeners may provide a very flexible means for the configuration of the comparator 30 so that the actual processing of the user input can be easily adapted to changing requirements.

In addition, there may be a Default Event Listener 35, which may identify all modifications made on the original XML form by the user which may not be processed by other Event Listeners. Providing the Default Event Listener 35 may assure that all inputs from the user are processed. The Default Event Listener 35 may for example provide error handling, i.e. processing steps performed in case of non-allowed entries of the user, such as the display of an error message or the return to step 10 in order to present again the original XML form to the user for modification.

The parallel arrangement of the processing steps 41, 42 and 45 in FIG. 1 reflects that the operations of the various Event Listeners 31, 32 and 35 may take place at the same time, to reduce the processing time necessary to fully analyze the modified XML form. In contrast to the prior art, the parallel processing may not affect the reliability of the Default Listener 35 to track all differences, which may not be identified by other Event Listeners.

In the following, the operation of the system generally described above with reference to FIG. 1 will be further explained with reference to the exemplary XML document 100 shown in FIG. 2. As can be seen, the XML document 100 is an Order Template comprising the bank details, the address as well as an order list, which is initially empty. Such a XML document may for example serve as the technical means to process orders of a customer in an online shop (not shown).

However, it is to be noted that the present invention is not directed to or limited to a specific business model or business rules. On the contrary, the XML documents 100 and 200 are only examples and the present invention might as well be used for the analysis of other types of XML documents, for example indicating the parts of a machine to be assembled on an assembly line. Further, whereas the XML document 100 already contains a number of text nodes, there may also an empty template be used for the described embodiment of the method and system of the present invention.

FIG. 3 presents an example of the XML document 200, resulting from the modifications of the original XML document 100 by the user. As can be seen, the address has been changed and two items were added to the order list. Rather than analyzing the modified XML document 200 on its own, the method may use a structured and configurable comparison of the XML documents 100 and 200 to identify relevant input from the user.

The result of this comparison, according to one embodiment, is shown in the table of FIG. 4. Accordingly, the above described Event Listener 31 may have identified two new items in the order list and the Event Listener 32 may have noted the change in the address of the customer. Depending on these data changes, different actions may be triggered during further processing steps. For example, the detection of the new items may initiate a process for collecting and packaging these items so that they can be sent to the customer. The identified change of the address can be used to update a customer data base. It is apparent that the two processes are not related and can therefore be performed in parallel.

It is to be noted that the result of the analysis of the comparator 30 on the XML documents 100 and 200 is to a large extend independent from the specific structure of the XML template file 100. For example, if the XML document 100 contained further tags indicating the birthday of the customer, the processing logic of the Event Listeners 31 and 32 would not have to be adapted but would still lead to the above described results. This is a significant advantage over an analysis of the modified XML document 200 based on absolute selection paths. Here, a change in the structure of the XML document would in most cases require an adaptation of the processing logic.

FIG. 5 presents an example of how the results of the table in FIG. 4 can be highlighted in the HTML report of the comparator. As can be seen, the report indicates all changes, namely the new street address as well as the two added items. As shown in the upper part of FIG. 5, the report might additionally indicate the specific configuration settings of the tool used for the comparison of the two XML documents, which is described in more detail in the following section.

In one embodiment, the comparator 30 may compare the two XML documents 100 and 200 using the tool XML Difference Tracker which is described in the following. However, other tools for a controlled comparison of two or more XML documents may also be used in the context of the present invention.

The XML Difference Tracker may allow for comparison of/between XML documents and trees. It may provide various options such as an advanced namespace handling, i.e. namespace awareness to distinguish elements and attributes residing in different namespaces, prefix awareness, whitespace awareness to distinguish XML documents having the same content but a different layout. Further, sub trees within XML documents can be selected or dropped using XPATH statements.

In addition, XML Difference Tracker can be configured to distinguish XML documents having the same text nodes but in a different order. Alternative, the comparison tool can be set to disregard the order of the nodes of the compared XML documents.

XML Difference Tracker can generate HTML output with highlighting and using customized templates. Other options are XML output, wherein the differences are reported as XPATH statements or a Boolean output, wherein two XML documents are either found to be identical (true) or not (false). The input XML Documents for XML Difference Tracker can be available as URLs, files or streams.

As a result, the XML Difference Tracker is, due the above described wide variety of possible settings, suitable to be used in the above explained comparator of an embodiment of the invention so that the processing of the modified XML document 200 can be tailored to the processing requirements of the organization implementing the described method and system.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for processing the input in a XML form, comprising:
    utilizing a computer to perform:
        providing a template XML form, wherein the template XML form defines a first schema, and wherein the template XML form comprises one or more data entry fields;
        receiving a modified XML form, wherein the modified XML form has the first schema, wherein the modified XML form comprises user-supplied content not present in the template XML form comprising at least one entry made by a user or application filling in a corresponding at least one data entry field of the one or more data entry fields;
        detecting the differences between the template XML form and the modified XML form, wherein the differences comprises differences regarding entries of one or more data entry fields in the modified XML form and the template XML form, wherein said detecting is performed by a configurable comparator via one or more Event Listeners, and wherein said detecting comprises each of the one or more Event Listeners detecting a respective type of difference regarding the entries in the modified XML form and the template XML form; and
        further processing the modified XML form based on the detected differences.

2. The method of claim 1, wherein said detecting is restricted to differences concerning predetermined entries in the template XML form and/or the modified XML form.

3. The method of claim 1, wherein the one or more Event Listeners comprise one or more of:
    an Add Event Listener detecting one or more added entries;
    a Modified Event Listener detecting one or more modified entries; or
    a Delete Event Listener detecting one or more deleted entries in the modified XML form.

4. The method of claim 1, wherein the one or more Event Listeners comprise a Default Listener detecting differences between the template XML form and the modified XML form, which are not detected by any of the other Event Listeners of the one or more Event Listeners.

5. The method of claim 1, wherein said detecting comprises:
    at least two of the one or more Event Listeners processing the modified XML form in parallel.

6. The method of claim 1, wherein said detecting comprises use of an XML difference tracker detecting the differences between the template XML form and the modified XML form.

7. The method of claim 6, wherein the XML difference tracker is selectively namespace aware.

8. The method of claim 6, wherein the XML difference tracker is selectively whitespace aware.

9. The method of claim 6, wherein the XML difference tracker is selectively aware of different orders of the elements of two XML forms to be compared.

10. The method of claim 1,
    wherein the modified XML form further comprises one or more new occurrences of entries that are compliant with the schema; and
    wherein the differences further comprise differences regarding the one or more new occurrences of entries in the modified XML form.

11. A non-transitory memory medium comprising program instructions for processing the input in a XML form, wherein the template XML form comprises one or more data entry fields, wherein the program instructions are executable by a processor to:
    provide a template XML form, wherein the template XML form defines a first schema;
    receive a modified XML form, wherein the modified XML form has the first schema, wherein the modified XML form comprises user-supplied content not present in the template XML form comprising at least one entry made by a user or application filling in a corresponding at least one data entry field of the one or more data entry fields;

detect the differences between the template XML form and the modified XML form, wherein the differences comprise differences regarding entries of one or more data entry fields in the modified XML form and the template XML form, wherein the differences are detected by a configurable comparator via one or more Event Listeners, and wherein said detecting comprises each of the one or more Event Listeners detecting a respective type of difference regarding the entries in the modified XML form and the template XML form; and further process the modified XML form based on the detected differences.

12. The non-transitory memory medium of claim 11, wherein said detecting is restricted to differences concerning predetermined entries in the template XML form and/or the modified XML form.

13. The non-transitory memory medium of claim 11, wherein the one or more Event Listeners comprise one or more of:

an Add Event Listener detecting one or more added entries;
a Modified Event Listener detecting one or more modified entries; or
a Delete Event Listener detecting one or more deleted entries in the modified XML form.

14. The non-transitory memory medium of claim 11, wherein the one or more Event Listeners comprise a Default Listener detecting differences between the template XML form and the modified XML form, which are not detected by any of the other Event Listeners of the one or more Event Listeners.

15. The non-transitory memory medium of claim 11, wherein said detecting comprises:

at least two of the one or more Event Listeners processing the modified XML form in parallel.

16. The non-transitory memory medium of claim 11, wherein said detecting comprises use of an XML difference tracker detecting the differences between the template XML form and the modified XML form.

17. The non-transitory memory medium of claim 16, wherein the XML difference tracker is selectively namespace aware.

18. The non-transitory memory medium of claim 16, wherein the XML difference tracker is selectively whitespace aware.

19. The non-transitory memory medium of claim 16, wherein the XML difference tracker is selectively aware of different orders of the elements of two XML forms to be compared.

20. The non-transitory memory medium of claim 11,
wherein the modified XML form further comprises one or more new occurrences of entries that are compliant with the schema; and
wherein the differences further comprise differences regarding the one or more new occurrences of entries in the modified XML form.

\* \* \* \* \*